B. RYDER, Jr.
Dumping-Wagon.
No. 63,309.  Patented Mar. 26, 1867.
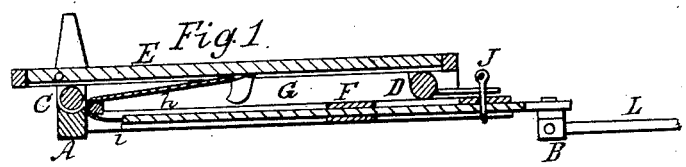
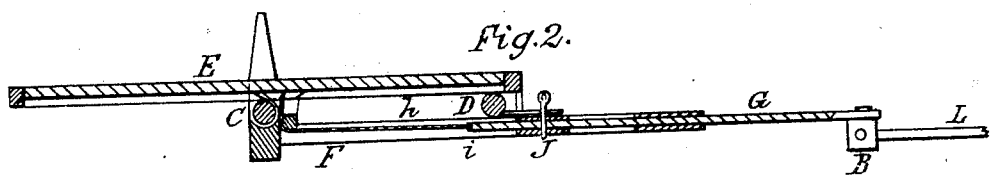
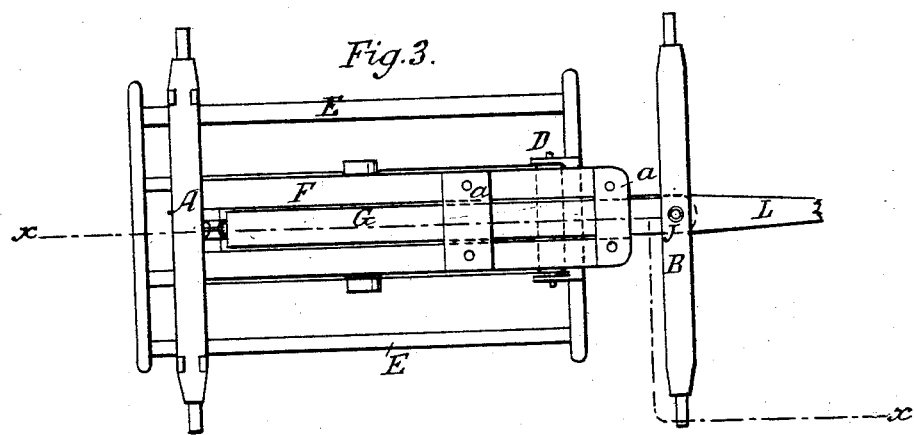
Witnesses.
Theo Tusche
Wm Trewin
Inventor.
Benj Ryder jr
Per Wimur & Co
Attys.

United States Patent Office.

BENJAMIN RYDER, JR., OF SOUTH ORRINGTON, MAINE.

Letters Patent No. 63,309, dated March 26, 1867.

IMPROVEMENT IN WAGONS.

*The Schedule referred to in these Letters Patent and making part of the same.*

TO ALL WHOM IT MAY CONCERN:

Be it known that I, BENJAMIN RYDER, Jr., of South Orrington, in the county of Penobscot, and State of Maine, have invented a new and useful Improvement in Wagons; and I do hereby declare that the following is a full, clear, and exact description thereof, which will enable others skilled in the art to make and use the same, reference being had to the accompanying drawings, forming part of this specification.

The object of this invention is to obviate the necessity of employing so many wagons for the various purposes of the farm and road, and it consists in adapting one wagon by a proper arrangement of parts to all or nearly all the various uses which a farmer and others may have for a wagon designed for carrying loads, as will be hereinafter described.

Figure 1 represents a side view of my wagon arrangement without the wheels, showing the bottom of the body of the wagon in its proper place to receive a load.

Figure 2 is a view of the same with the axles extended and the body drawn back or nearly balanced over the rear axle as for dumping.

Figure 3 is a top or plan view, with the wagon-bottom removed, leaving the bottom frame.

Similar letters of reference indicate like parts.

A represents the rear axle, and B the forward axle. C is a friction-roller over the rear axle, upon which the rear portion of the wagon-body rests. D is another roller which is attached to the under side of the body, and which traverses back and forth over the reach frame as the body is moved forward or back. E represents the bottom of the wagon-body, or rather the frame of the bottom. As before stated this bottom frame moves on and over the rollers C D. F represents a frame composed of two parallel pieces of timber, which are fastened together by cross-ties at and near their forward ends. Their back ends are rigidly attached to the rear axle. These pieces are placed a distance apart sufficient to admit the wagon reach, which is allowed to slide back and forth between them. G represents the reach. It is supported by plates which are fastened to the under side of the frame. The reach is attached to the forward axle at its forward end. The cross-ties marked *a* do not extend to the bottom side of the frame F, so that a space is left for the reach within the frame. As before stated the roller D travels upon the top of this frame. *h* is a chain or cord, which is attached to the bottom frame of the wagon-body at or near its centre at one end; the other end is attached to the back end of the reach at *i*. This chain passes over a staple or pulley which is fast to the rear axle, as seen in the figures. The reach is held in any desired position by a pin, J, which passes through the frame F and the reach, as seen in the drawing. L represents the wagon-tongue.

In using the wagon under ordinary circumstances, the wagon-body, which is represented by E, would stand in the position represented by fig. 1. Now if the wagon-body contained a load which it was desired to dump, the pin J would be removed, which would allow the reach to be drawn forward by the team. In drawing the reach forward the load would be drawn back, and it would be found in the position represented by fig. 2, which, as is seen, is nearly balanced over the back roller C, and where it can easily be dumped. This arrangement answers all the purposes of a dumping cart for moving earth or manure, and the arrangement which allows the reach and forward axle and wheels to be extended accommodates long lumber or timber.

What I claim as new, and desire to secure by Letters Patent, is—

The frame G, which supports the reach and allows the wheels to be extended forward substantially as described.

I claim the rollers C D, and the chain *h*, arranged and operating substantially as shown and described for the purposes specified, in combination with the wagon-body.

BENJAMIN RYDER, Jr.

Witnesses:
 SAMUEL T. NICKERSON,
 LINCOLN WHEELDEN.